3,850,880
PROCESS FOR THE PREPARATION OF GRANULAR POLYURETHANES AND PRODUCT OBTAINED THEREBY
Christer Lennart Hakanson and Hermann Pius Schmid, Karlskoga, Sweden, assignors to Aktiebolaget Bofors, Bofors, Sweden
No Drawing. Filed Nov. 22, 1972, Ser. No. 308,667
Claims priority, application Sweden, Dec. 8, 1971, 15,764/71
Int. Cl. C08g 22/04, 22/38
U.S. Cl. 260—75 NE    7 Claims

ABSTRACT OF THE DISCLOSURE

Process for the preparation of more or less thermoplastic polyurethane elastomers in the form of granules or a powder by reacting an essentially anhydrous linear dihydroxy compounds, a diisocyanate and a chain extender in the presence of a catalyst.

---

The present invention refers to a process for the preparation of more or less thermoplastic polyurethane elastomers in the form of granules or powder. The process is based on reacting an essentially anhydrous linear dihydroxy compound, a diisocanyate and a chain extender in the presence of a catalyst.

As known, polyurethane elastomers may be prepared by a polyaddition procedure by reacting linear, bifunctional hydroxy compounds in the form of polyesters, polyethers or polyester amides and diisocyanates and low molecular bifunctional chain extenders. A great number of processes are based on this polyaddition technique. The linear dihydroxy compound is usually reacted with the diisocyanate and the chain extender in suitable molar ratios at a reaction temperature of 80–160° C. under the formation of thermoplastic polymers. The prior art also includes processes, according to which isocyanate-terminated prepolymers are prepared from polyesters, polyethers or polyester amides and diisocyanates, said prepolymers being then reacted with chain extenders in a second reaction step. During the final reaction the molecular weight and viscosity of the product increase to a high level. In the above-mentioned processes hitherto used this requires a particular reaction apparatus enabling a highly effective mixing at high temperature. Usually a reaction apparatus designed as an extruder of the screw-type is used. From the extruder an elastomer is obtained which is cut to pieces of a suitable size.

Previously used processes thus require the purchase of expensive special apparatus, which is a significant disadvantage.

Another disadvantage of the previously used processes is the difficulty of completing the reaction to a desired molecular weight in such a way that a stable polymer will be obtained which maye be stored for a long period of time without change in molecular weight. In the usual procedure, the reaction is completed by means of high temperature and/or long reaction time, whereby all reactive atomic groups are reacted to the greatest possible extent. The primarily extruded product is usually not finally reacted and it has therefore been the practice to post-react the product by heating at 120–180° C. on plates or by reextruding the product at high temperature. Attempts have also been made to use a catalyst, for instance a tertiary amine or a metal compound, to accelerate the final reaction, but the elastomers produced hereby show unsatisfactory hydrolysis stability and storage stability as regards molecular weight and colour, which is due to the presence of catalyst which has not completely been removed. They also very often emit an unpleasant smell.

A further disadvantage of processes hitherto used is the fact that the product is obtained in a form which is relatively difficult to dissolve in a solvent, which is desirable when the product is to be used for coating of textile materials or the like. The product is obtained by the extrusion procedure in relatively large, compact pieces or granules, which in order to be dissolved in dimethylformamide and similar solvents or solvent mixtures require special apparatus and/or long periods of dissolution.

The present invention aims at eliminating the above-noted problems, to make possible, while using a simple standard apparatus to prepare colourless, more or less thermoplastic polyurethane elastomers, having advantageous physical characteristics and good storage and hydrolysis stability and low smell, and which may be provided in the form of a more or less porous, easily soluble powder or granulate.

One purpose of the present invention is thus to provide a process enabling the preparation of a polyurethane product in granule or powder form, said product being then easily dissolvable in a solvent for further use or being directly useful for processing to artifacts of different kinds, for instance, by melt extrusion.

The process according to the invention is largely characterized by reacting a linear dihydroxy compound with a molar excess of a diisocyanate to the formation of a pre-polymer, said pre-polymer being dissolved in a chemically inert and anhydrous solvent, adding to the resulting solution a chain extender in a slight molar deficit based on the calculated amount of free diisocyanate, then adding a volatile tertiary amine as a catalyst and continuing the reaction till the originally clear solution gradually passes to a dispersion, and then subjecting said dispersion as a whole or after the separation of part of the solvent to water vapour treatment while vaporizing the catalyst and the solvent, the resulting polyurethane being then separated from the aqueous phase obtained.

Effective mixing is applied during the whole reaction.

The molar excess of diisocyanate used when reacting the linear dihydroxy compound with the diisocyanate may be varied within broad limits in dependence on the hardness desired of the final polymer. Suitably, a molar excess is used which imparts to the pre-polymer an amine equivalent of about 400–900. The addition of the chain extender is made in an amount such that a calculated molar excess of free isocyanate groups corresponding to an amine equivalent of about 4000–10,000 is maintained.

The expression "amine equivalent" refers to the way commonly used within the art of polyurethane chemistry for expressing the content of pre-isocyanate groups available after the different polymerisation steps. The amine equivalent is equal to the number of grams of the isocyanate-containing sample which consumes 1 gram mole secondary amine under the formation of the corresponding carbamide.

The different chemical compounds useful in the process of the instant invention for the preparation of polyurethane elastomers may thus generally be divided up into five groups, namely:

Linear dihydroxy compounds
Diisocyanates
Chain extenders
Catalysts
Solvents.

As dihydroxy compounds, for instance, linear polyethers, polyesters, polyester amides, polyacetals and polycarbonates are suitable. Preferred dihydroxy compounds are those having a molecular weight of between 500 and 7000.

The process according to the instant invention is not delimited to the use of any single compound of the above enumerated and to obtain particular characteristics in the final product, mixtures of the compounds may be used. The dihydroxy compounds may have aliphatic, aromatic or cycloaliphatic molecular structure.

As examples of suitable dihydroxy compounds, there may be used polyesters of adipic acid and dialcohols, for instance, ethylene glycol, propylene glycol, 1,4-butanediol, 2,5-hexanediol, 2,2-dimethyl propane diol, 1,6-hexanediol, β-hydroxyethylhexanediol or neopentyl glycol

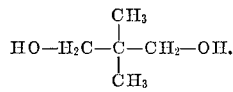

Mixtures of the last-mentioned compounds may also be used. For the preparation of particularly hydrolysis resistant polyurethane elastomers having good low temperature characteristics, caprolactone polyesters may be used. Such esters may be prepared by polyaddition of caprolactone to glycols or amines.

Such polycaprolactones may be used alone or in combination with other dihydroxy compounds.

Polyurethane elastomers having good characteristics may be obtained also on the basis of polyalkylene ethers, for instance, polytrimethylene ether diols, polypropylene glycols, polytetramethylene ether diols or mixed polyethers.

When applying the process according to the present invention, there may be used as diisocyanates, single compounds or mixtures of such compounds. The diisocyanates may have aliphatic, cycloaliphatic, araliphatic, aromatic or heterocyclic molecular structure. As examples of useful diisocyanates, the following may be mentioned: 2,4-toluene diisocyanate and 2,6-diisocyanate or their isomeric mixtures, diphenyl methane-4,4-diisocyanate, diphenyl-dimethyl-methane-4,4-diisocyanate, phenylene diisocyanate-1,4, 2,2-6,6-tetra-methyl-diphenyl methane-4,4,-diisocyanate, diphenyl-4,4-diisocyanate, diphenylether-4,4-diisocyanate or their halogen-substituted products, 2,6-diisopropylene-1,3-diisocyanate, m-xylenediisocyanate, p-xylenediisocyanate, tetra-methyl - p - xylenediisocyanate, dimer-toluene-2,4-diisocyanate, hexane-1,6 - diisocyanate, cyclo-hexane-1,4-diisocyanate, dicyclo-hexyl-methane-4,4-dissocyanate, 2,2,4-trimethyl-hexane - 1,6 - dissocyanate, 1,2,3,4,5,6-hexahydrodiphenylmethane-4,4 - diisocyanate, and naphthalene-1,5-diisocyanate.

When using polyesters as a dihydroxy compound, diisocyanates may advantageously be used containing 1–20 percent by weight of carbodiimides. This results in a polyurethane elastomer having highly improved hydrolysis stability.

As chain extenders, there may be used as in the processes of the prior art, low molecular diols, diamines, hydroxy amines or mixtures thereof, and water. The molecular structure may be aliphatic, cycloaliphatic or aromatic. As is the case with the diisocyanate compounds, a symmetrical molecular structure is of advantage but is not a requirement. When using diamines or water as chain extenders, a certain cross-linking occurs in the reaction in view of the presence of double active hydrogens. A preferred compound for use as a chain extender is 1,4-butanediol.

As previously indicated, a suitable catalyst is used to complete the reaction and to provide a polymer having sufficiently high molecular weight and desired characteristics. To facilitate complete removal of the catalyst from the final product, the catalyst should be volatile. Preferred catalysts are tertiary amines, particularly trimethylamine and triethylamine.

The solvent should be chemically inert and anhydrous. It should also possess low solubility to water and to high molecular polyurethane fractions, but high solubility to low molecular polyurethane fractions. An essential advantage is obtained when the solvent forms an azeotropic mixture with water. Suitable solvents are e.g., aliphatic and aromatic chlorinated hydrocarbons, and aromatic hydrocarbons. Particularly suitable solvents are xylene and toluene.

The preparation of polyurethane elastomers by the technique of the present invention is thus carried out while using the above-mentioned starting materials. The process may be carried out in reaction apparatus conventionally used in the chemical industry. Below there is given a brief description regarding the practical application of the process.

The dihydroxy compound to be used must initially be thoroughly freed from water. The water content of the dihydroxy compound must not exceed about 0.05 percent by weight. The dihydroxy compound is then transferred to a clean and dried reaction vessel. Said vessel should be provided with a mixer and means for supply of nitrogen gas. Suitably, it should be possible to carry out continuous time and temperature measurements in the course of the reaction.

To the dihydroxy compound, preferably in the form of a melt, transferred to the reaction vessel there is added at a temperature of about 90–100° C., the calculated amount of diisocyanate in one portion and as rapidly as possible. The amount of diisocyanate is adjusted so that an amine equivalent of about 400–900 is obtained at the end of the polyaddition. The polyaddition reaction is initially weakly exothermic and is to be carried out in the absence of moisture, for instance, under an atmosphere of dry nitrogen gas. The reaction temperature must not be allowed to exceed about 100° C. After a suitable reaction time, for instance about 30 minutes, there is obtained an NCO-terminated polyurethane. The reaction time may vary depending on the reactivity of the diisocyanate used.

The reaction product obtained is cooled to a suitable temperature and is dissolved in an excess of the chemically inert solvent, for instance, xylene. This results in a low viscosity, clear solution of polyurethane pre-polymer. To said solution and at a suitable temperature, the chain extender is added in an amount resulting in a certain slight excess of NCO-groups in the final product (corresponding to an amine equivalent of 4,000–10,000). Of course, this excess may be varied from case to case depending on the desired characteristics of the final product. Then the catalyst is added in an amount of 0.1 to 10 percent by weight based on the amount of solvent, suitably dissolved in the solvent. After the addition of amine, a distinct exothermic reaction may be observed. A constant reaction temperature is maintained by cooling. When using aromatic diisocyanates, the reaction temperature after the addition of the catalyst should be maintained at about 40–60° C., whereas when using aliphatic or cycloaliphatic diisocyanates a reaction temperature of up to about 80° C. may be allowed.

The addition of catalyst enables an effective completion of the chain extending reactions. In view of this but probably also in view of other, simultaneously occurring reactions, a molecular growth of the polymer increasing with time and temperature is obtained. These other reactions may consist in the formation of isocyanurate groups and other linkages contributing to the branching of the polymer structure. The initially clear solution passes to a dispersion after addition of the chain extender and the catalyst. By suitable effective stirring a more or less porous powder or granulate is obtained.

The reaction mixture is then transferred as a whole or possibly after the separation of part of the solvent to a reaction vessel, wherein all further reaction is interrupted by the supply of water, steam or vapour. The solvent is hereby evaporated by steam distillation, the volatile catalyst being removed at the same time. As a result the product is obtained in an aqueous slurry. By centrifugation or other conventional manner, the product is then separated from the aqueous phase and dried at an increased temperature, for instance 60–80°, at normal pressure or under vacuum.

Polyurethane elastomers prepared by the process of the present invention may be varied as to characteristics from easily soluble, thermoplastic products, to insoluble, less thermoplastic products. By suitable control of the reaction conditions, products may be prepared, which after being dissolved in a suitable solvents, for instance, dimethylformamide or mixtures of dimethylformamide and methyl-ethyl ketone, may cover a viscosity range from some hundreds of centipoises to several hundred thousand centipoises.

By means of the procedure of the present invention, it is possible to prepare polyurethane elastomers having good mechanical characteristics and excellent storage stability and stability to hydrolysis, which is of a great importance when manufacturing a plurality of end products, such as, textile coatings, non-woven materials, poromeric materials, for instance, for synthetic leather and for surface treatment of genuine leather, thermoplastic powders for injection moulding, calendering and powder-coating of surfaces and for the preparation of synthetic fibres.

In the following the invention will be further illustrated by specific examples, said examples, however, not being intended to delimit the invention.

Example 1

A clean and dry reaction vessel was charged with 61.73 parts by weight of a linear polyester having a molecular weight of 2,000 based on adipic acid and ethylene glycol and having a hydroxy number of 50–60 (a suitable polyester is Desmophen 2,000). The polyester is molten while stirring and the temperature is raised to 100–120° C. and a stream of dry nitrogen gas is passed through the polyester for complete removal of its water content. After five hours of nitrogen gas passage, the water content is as a rule lowered to less than 0.02 percent by weight.

To the molten polyester, 30.87 parts by weight of diphenylmethane - 4,4' - diisocyanate (corresponding to an amine equivalent (AE) of 497) is added in solid form in a rapid operation. The reaction temperature is maintained at about 95° C. and the reaction period is about 30 minutes. The reaction mixture is then cooled to about 50° C. and 135 parts by weight of xylene is thereafter added under stirring. This results in a low-viscosity mixture of obtained pre-polymer. After complete dissolution, 7.40 parts by weight of 1,4-butanediol (AE=4545) are added and then 10 parts by weight of xylene containing 2.5 percent by weight of trimethylamine as a catalyst. The reaction temperature is maintained at about 50° C. and in view of the exothermic reaction, cooling of the reaction mixture is required, whereby the temperature is not allowed to exceed 55° C. After about 15 minutes, an emulsion of the polymer in xylene is formed. After further 10 minutes this emulsion has passed to a suspension of the polymer.

The polymer dispersion is stirred at a temperature of about 50° C. for a period of time of 100 minutes. Then super-heated steam is supplied thereto, an azeotropic mixture of xylene and water distilling off while removing the whole amount of trimethylamine. This results in interruption of all reactions in the reaction mixture and after 45 minutes there is obtained a granulate of polymeric material in aqueous phase. The polyurethane product is centrifuged for the separation of water and dried at 80° C. in a drying drum. The product obtained shows the following characteristics:

Melting temperature: 170° C.
Viscosity according to Brookfield; 25% weight/volume solution of the polymer in a 1:1 mixture of dimethylformamide and methyl-ethyl ketone at 20° C.: 6,000 cps.

The physical characteristics of the polymer of this example and of the following examples were investigated on a film having a thickness of 1 mm. and obtained from a 25% w./v. solution of the polymer in dimethylformamide. This solution was poured and after drying at 100° C. and complete vaporization of the solvent the film was obtained.

Tensile strength: 400–600 kp./cm.$^2$
Elongation to rupture: 700–800%

Example 2

A reaction vessel equipped with means for the supply of nitrogen gas was charged with 70.18 parts by weight of the polyester according to Example 1, said polyester being freed from water in the manner stated in said example. Under stirring and at a temperature of about 95° C. 24.56 parts by weight of diphenylmethane-4,4'-diisocyanate (AE=740) are added in solid form. The reaction temperature is maintained constant at 95° C. and the reaction is allowed to proceed for a period of time of 30 minutes. Then the reaction mixture is cooled to about 50° C. and 135 parts by weight of xylene are added while stirring. This results in a low viscosity solution of the polymer in xylene. After complete dissolution of the polymer, there is added 5.26 parts by weight of 1,4-butanediol (AE=9090) and then 10 parts by weight of xylene containing 2.5 percent by weight of trimethylamine as a catalyst. The reaction temperature is maintained constant at 50° C. and the exothermic reaction results in need for cooling, so that the temperature is not allowed to exceed 50° C. After about 15 minutes there is formed an emulsion of the polymer in xylene and after about further 10 minutes, there is obtained a dispersion of the polymer. This dispersion is stirred at a temperature of 50° C. for a period of time of 100 minutes.

Then the polymer dispersion is supplied with superheated steam, resulting in an azeotropic mixture of xylene and water being distilled off at a temperature of 94° C., so that residual trimethylamine is removed and all reactions are interrupted. After 45 minutes there is obtained a granulate of polymeric material in aqueous phase. The polyurethane product is centrifuged for the separation of water and is dried at 80° C. in a drying drum. The material shows the following characteristics:

Tensile strength: 400–500 kp./cm.$^2$
Elongation to rupture: 800%
Melting temperature: 140° C.
Viscosity according to Brookfield: 25% weight/volume solution of the polymer in a 1:1 mixture of dimethylformamide and methyl-ethyl ketone at 20° C.: 4000 cps.

Example 3

A reaction vessel equipped with means for the supply of nitrogen gas is charged with 62.50 parts by weight of the polyester of Example 1, said polyester being freed from water in the manner disclosed in Example 1. While stirring and at a temperature of about 95° C., 25.00 parts by weight of diphenylmethane - 4,4' - diisocyanate (AE=629) are added in solid form. The reaction temperature is maintained constant at 95° C. and the reaction is allowed to proceed for a period of time of 30 minutes. Then the reaction mixture is heated to about 105° C. and 135 parts by weight of xylene are added while stirring. This results in a low-viscosity solution of the polymer in xylene. To said solution there is added 12.50 parts by weight (corresponding to a (AE) of 7143) of p-phenylene-bis (β-hydroxy-ethylether) in molten form (melting point 104° C.). Immediately after the addition, the mixture is cooled to 50° C. Then 10 parts by weight of xylene containing 2.5 percent by weight of trimethylamine are added. The exotherm developing under the reaction is controlled so that the temperature will not exceed 60° C. After 5 minutes, there is formed after a rapid conversion through an emulsion phase, a polymer dispersion which is stirred at a temperature of about 55° C. for 90 minutes.

By adding superheated steam, all amine residues are removed and an azeotropic mixture of water and xylene leaves at about 94° C. After 45 minutes there is obtained a granulate of polymeric material in aqueous phase. The polyurethane material is drid at 80° C. in a rotating drying drum.

The material shows the following characteristics:

Tensile strength: 400 kp./cm.$^2$
Elongation to rupture 450%
Melting temperature: 180° C.

Example 4

72.99 parts by weight of the polyester pretreated according to Example 1 is charged in a clean and dry reactor under nitrogen atmosphere. To the amount of polyester calculated for the reaction there are added 21.90 parts by weight of naphthalene-1,5-diisocyanate (AE=694) in solid form under stirring. The reaction temperature should be 120° C. at the beginning of the addition and is to be lowered to 100° C. as soon as dissolution of the diisocyanate has occurred. The reaction temperature is maintained constant below 100° C. and the reaction is allowed to proceed for 30 minutes. Then the reaction mixture is cooled to 80° C. The resulting pre-polymer is dissolved in 135 parts by weight of xylene under stirring. This results in a low-viscosity solution. After complete dissolution, there are added 5.11 parts by weight of 1,4-butanediol (AE=4167) and then 10 parts by weight of xylene containing 2.5 percent by weight of trimethylamine. The exotherm formed is controlled by cooling so that the temperature will not exceed 60° C. After 15 minutes, there is formed an emulsion which is rapidly converted into a dispersion. The polymer dispersion is stirred at a temperature of 50° C. for 60 minutes. Then all the amine is removed by supplying superheated steam. At a temperature of 94–97° C., an azeotropic mixture of xylene and water is removed. After 45 minutes a granulate of polymeric material in an aqueous phase is obtained. The polyurethane granulate is centrifugated and dried at 80° C.

Tensile strength: 650 kp./cm.$^2$
Elongation to rupture: 500%
Melting temperature: 200° C.

Example 5

68.80 parts by weight of a polyester dried as per Example 1 are transferred to a clean and dry reactor under stirring and supply of a nitrogen gas. At a temperature of 90–100° C. 22.95 parts by weight of hexamethylenediisocyanate OCN—(CH$_2$)$_6$—NCO (AE=446) are added. The reaction temperature is maintained constant at said temperature and the reaction is allowed to proceed for 2 hours. Then the reaction mixture is cooled to 80° C. and dissolved in 165 parts by weight of xylene. After complete dissolution of the polymer, 8.25 parts by weight of 1,4-butanediol (AE=4348) are added at a temperature of 80° C. and shortly thereafter, 12.6 parts by weight of xylene containing 2.5 percent by weight of trimethylamine are added. At a post-reaction temperature of 80° C. and post-reaction time of 3 hours an amorphous, polymeric material is gradually formed. As soon as the desired molecular weight of the polymer has been reached, superheated steam is supplied and the whole amount of amine removed. Xylene is removed from the reaction mixture simultaneously under azeotropic distillation. After 45 minutes, a polymeric material in aqueous phase is obtained. The product is centrifuged and dried at 80° C. The polymer shows the following characteristics:

Tensile strength: 300–400 kp./cm.$^2$
Elongation to rupture: 500%
Melting temperature: 140–150° C.

Example 6

63.88 parts by weight of polypropylene glycol having a molecular weight of 1000 and a hydroxy number of 110 (Niax-polyol PPG–1025 from Union Carbide) is transferred to a clean and dry reactor. By heating to 100° C. and passing a nitrogen gas flow therethrough the polyether is freed from residual water. Then 21.80 parts by weight of toluene-diisocyanate (AE=685) consisting of an isomer mixture containing 80% 2,4-isomer and 20% 2,6-isomer are added. The reaction temperature is maintained constant at 85° C. and the reaction is allowed to proceed for 3 hours. Then the reaction mixture is cooled to 50° C. and 135 parts by weight of xylene are added. To the clear polymer solution, 14.32 parts by weight of 4,4' - methylene - bis - (2-chloramine) (AE=5555) are added and then 10 parts by weight of xylene containing 2.5 percent by weight of trimethylamine. The created exotherm is controlled by cooling, so that the temperature does not exceed 60° C. After 15 minutes a dispersion is formed. The polymer dispersion is stirred at a temperature of 50° C. for 100 minutes. By supplying superheated steam, all amine residues are removed. All reactions are interrupted and an azeotropic mixture of xylene and water is distilled off. After about 45 minutes, a granulate of polymeric material in aqueous phase is obtained. The polyurethane material is centrifuged and dried at 80° C. in a rotary drying drum. The polymer shows the following characteristics:

Tensile strength: 250 kp./cm.$^2$
Elongation to rupture: 500%
Melting temperature: 180° C.

In order to show the advantageous physical properties of the polyurethane polymers of this invention, a comparison has been made between certain prior art polyurethane elastomers and the polyurethane elastomer prepared as per Example 1 above. The comparison is based on measurements of tensile strength before and after steam treatment of films prepared from the elastomers in question. The films have a thickness of 1 mm. and are prepared as disclosed at the end of Example 1 above. The steam treatment is carried out in the following way in these experiments:

The film is treated in an autoclave with water-vapour for 4 hours at 120° C. The film is then dried at 100° C. for 2 hours and the tensile strength thereof is determined. The difference in tensile strength before and after the steam treatment is a measure on the hydrolysis resistance. The experimental results are given in the table below:

| Product tested | Tensile strength before steam treatment (kp./cm.$^2$) | Tensile strength after steam treatment (kp./cm.$^2$) |
|---|---|---|
| Elastollan DM-20 (Elastomer Gesellschaft AG, Germany) | 394 | 284 |
| Quinn-Elastomer QL 7066 (Quinn AG, Germany) | 87 | 30 |
| The Elastomer of Example 1 (AB Bofors, Sweden) | 438 | 363 |

The tested products are comparable as regards their chemical structure. All tested polyurethane elastomers are based on polyesters and diphenylmethane-4,4'-diisocyanate. As is clear from the results presented in the above table, the film based on the polyurethane elastomer according to Example 1 shows significantly improved hydrolysis resistance as compared to the prior art products.

For the purpose of investigating the resistance against ultraviolet radiation of known elastomers and elastomers of the instant invention, the films have been xenone tested. In this test, it has been found that due to the presence of residual catalyst in the products prepared as per the instant invention, the resistance to ultraviolet radiation for these products is substantially improved. This is indicated by comparison of colour changes of the films in connection with the ultraviolet irradiation. Since this is a change which is made by visual observation of films subjected to ultraviolet radiation no physical data are presented to show this technical effect.

The above examples are intended only to elucidate the invention and must not be considered as delimiting. Finally, it is remarked that the invention is not delimited to the preparation of polyurethanes containing only the building elements originating from the starting materials mentioned in the examples. In the preparation colouring agents, colouring pigments, stabilizers for light resistance and ageing may also be added. Moreover, agents may be added which improve the resistance to hydrolysis and to ozone and additives or fillers in the form of different pigments.

What is claimed is:

1. A process for the preparation of polyurethane elastomers in the form of granules or powders by reacting an essentially anhydrous linear dihydroxy compound, a diisocyanate and a chain extender, the improvement comprising reacting the linear dihydroxy compound with a molar excess of diisocyanate to the formation of a pre-polymer, said pre-polymer being dissolved in a chemically inert and anhydrous solvent, adding to the resulting solution the chain extender in a slight molar deficit relative to the above-mentioned molar excess of diisocyanate, then adding a volatile tertiary amine as a catalyst and allowing the reaction to proceed until the initially clear solution gradually passes into a dispersion, and then subjecting said dispersion to a steam treatment while vaporizing the catalyst and the solvent, and separating the resulting polyurethane from the aqueous phase obtained.

2. A process according to claim 1, wherein part of the solvent is separated from said dispersion before the steam treatment.

3. A process according to claim 1, characterized by using a dihydroxy compound having a molecular weight of 500–7000.

4. A process according to claim 1, characterized by using as a catalyst, trimethylamine.

5. A process according to claim 1, characterized by using as a solvent, xylene or toluene.

6. The process of claim 4, wherein the catalyst is pre-dissolved in the solvent.

7. Polyurethane in the form of granules or powders prepared by the process according to claim 1.

References Cited
UNITED STATES PATENTS

| | | | |
|---|---|---|---|
| 3,236,812 | 2/1966 | McElroy | 260—75 NE |
| 3,480,592 | 11/1969 | Dieterich et al. | 260—77.5 AA |
| 3,485,802 | 12/1969 | Witsiepe | 260—77.5 AA |
| 3,519,577 | 7/1970 | Olson | 260—2.5 BD |
| 3,525,717 | 8/1970 | Butler et al. | 260—75 NE |
| 3,655,627 | 4/1972 | Hutzler et al. | 260—77.5 AA |

H. S. COCKERAM, Primary Examiner

U.S. Cl. X.R.

260—75 NH, 77.5 AA, 77.5 AM